United States Patent
Ikematsu (10) Patent No.: US 6,756,898 B2
(45) Date of Patent: Jun. 29, 2004

(54) NETWORK TERMINATION DEVICE, ALARM TRANSFER SYSTEM AND ALARM TRANSFERRING METHOD

(75) Inventor: Ryuichi Ikematsu, Tokyo (JP)

(73) Assignee: NEC Corporation, Tokyo (JP)

(*) Notice: Subject to any disclaimer, the term of this patent is extended or adjusted under 35 U.S.C. 154(b) by 92 days.

(21) Appl. No.: 10/245,375

(22) Filed: Sep. 18, 2002

(65) Prior Publication Data

US 2003/0058106 A1 Mar. 27, 2003

(30) Foreign Application Priority Data

Sep. 26, 2001 (JP) ........................................ 2001-294936

(51) Int. Cl.$^7$ ................................................. G08B 1/00
(52) U.S. Cl. ........................ 340/531; 340/532; 370/242; 714/4; 714/25
(58) Field of Search ................................. 340/531, 532, 340/533, 687, 502; 370/242, 244, 252; 714/4, 18, 25, 31, 48

(56) References Cited

U.S. PATENT DOCUMENTS 5,936,941 A * 8/1999 Kondo et al. ............... 370/242

6,260,158 B1 * 7/2001 Purcell et al. ............... 714/10
6,389,555 B2 * 5/2002 Purcell et al. ............... 714/10

* cited by examiner

Primary Examiner—Toan N. Pham
(74) Attorney, Agent, or Firm—McGinn & Gibb, PLLC (57) ABSTRACT

Provided is a mode of alarm transfer for use in a system for transmitting an encapsulated Ethernet signal between an Ethernet termination device (110) connected to a terminal (100) and an Ethernet termination device (120) connected to a terminal (200) being disposed opposite to each other. The Ethernet termination device (110) detects notification form the Ethernet termination device (120) regarding a link down between the terminal (200) and the Ethernet termination device (120), or detects occurrence of a failure on a transmission path between the Ethernet termination device (110) and the Ethernet termination device (120). When a link between the terminal (100) and the Ethernet termination device (110) is disconnected forcibly based on the detection, notification to the Ethernet termination device (120) regarding the link down between the terminal (100) and the Ethernet termination device (110) is withheld.

12 Claims, 8 Drawing Sheets

NETWORK TERMINATION DEVICE, ALARM TRANSFER SYSTEM AND ALARM TRANSFERRING METHOD

BACKGROUND OF THE INVENTION

1. Field of the Invention

The present invention relates to a network termination device, an alarm transfer system and an alarm transferring method for use in a system for transmitting an Ethernet signal encapsulated by the generic framing procedure (the "GFP") or the like. More specifically, this invention relates to a network termination device, an alarm transfer system and an alarm transferring method, which are collectively designed for a case when a link down of one Ethernet termination device is detected so as to inform a link down alarm to an opponent Ethernet termination device and thereby to disconnect a link with an opponent terminal.

2. Description of the Related Art

In the case where the Ethernet is used for communication between computers (more specifically, personal computers), network monitoring across-the-board as the Internet has not been conventionally conducted. It is due to the fact that the Internet has been offered originally as a best-effort service (which refers to a service usable depending on bandwidth margins, however, such bandwidths or quality are not always guaranteed).

Nevertheless, there are growing movements for utilizing the Internet as a backbone network, and needs for guarantee of the bandwidth and the quality are increasing. For example, a protection function for relieving lines by switching to a backup transmission path upon failures of a main transmission path is required as guarantee of quality.

Figure 1:
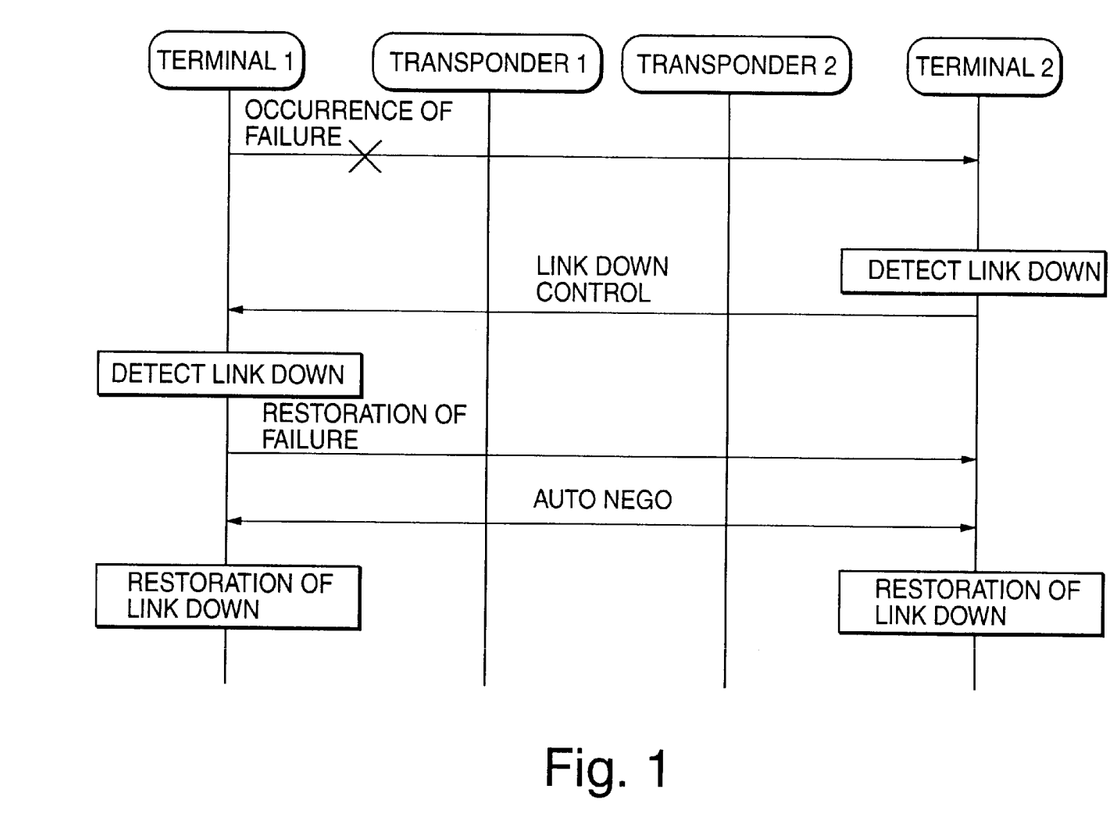
FIG. 1 is a sequence diagram showing a flow of an operation of alarm transfer in the prior art.

FIG. 1 shows a sequence of a conventional alarm transferring operation.

Conventional monitoring has been highlighted on whether a data link is established between one terminal and another terminal. In this case, a failure can be detected as disconnection of a link with the opponent terminal regardless of where such a failure happens between the terminals. Further, control for disconnecting the sender's terminal is carried out, whereby the sender's terminal can recognize the failure by itself as disconnection to the link.

The above-described operation does not change if a transponder is interposed between the terminals, as long as the transponder transfers data from the terminal intactly without processing.

For example, when a plurality of Ethernet signals are multiplexed and then transferred, it is necessary to identify as to which Ethernet signal each packet is originally contained. Therefore, a method of encapsulating a packet on an intermediate zone by use of the GFP or the like while posting an identification code in a GFP header is conceivable.

However, upon transfer of data encapsulated by use of the GFP technology or the like, data link control between terminals is disabled. As a result, the opponent terminal cannot detect a failure occurred somewhere on the intermediate zone.

SUMMARY OF THE INVENTION

An object of this invention is to provide a mode of alarm transfer for use in a case of transferring data encapsulated by the GFP or the like on an intermediate zone of an Ethernet path.

A network termination device of this invention is a network termination device for transmitting a data signal from a terminal connected through a link toward another network termination device via a transmission path. Here, the network termination device includes an alarm processing circuit for detecting notification of a link down of the link connected to the other network termination device and occurrence of a failure on the transmission path. Moreover, the network termination device disconnects the link forcibly and withholds notification of the disconnection outward when the alarm processing circuit detects any of the notification and the occurrence of the failure.

An alarm transfer system of this invention includes a plurality of network termination devices severally connected to corresponding terminals, the network termination devices being connected to one another via a transmission path, in which at least one of the network termination devices includes the above-described network termination device.

An alarm transferring method of this invention is used in a system for transmitting a data signal between a first network termination device connected to a first terminal through a first link and a second network termination device connected to a second terminal through a second link via a transmission path. Here, the method includes the steps of detecting notification from the second network termination device concerning a link down of the second link and occurrence of a failure on the transmission path by use of the first network termination device, and disconnecting the first link forcibly based on the detection. Here, when the step of disconnecting is executed, the first network termination device withholds notification of the disconnection of the first link to the second network termination device.

Another alarm transferring method of this invention of another configuration is used in a system for transmitting a data signal among at least three network termination devices via a transmission path, the network termination devices being severally connected to corresponding terminals through links. Here, the method includes the steps of detecting notification concerning a link down of the link from any other network termination device and occurrence of a failure on the transmission path connected to the network termination device performing detection by use of any one of the network termination devices, and performing forcible link down control based on the detection. Here, the network terminal device withholds notification of execution of the link down control to the rest of the network termination devices.

BRIEF DESCRIPTION OF THE DRAWINGS

The above and other objects, features and advantages of this invention will become more apparent from the following detailed description when taken in conjunction with the accompanying drawings wherein.

DETAILED DESCRIPTION OF THE PREFERRED EMBODIMENTS

First Embodiment

Figure 2:
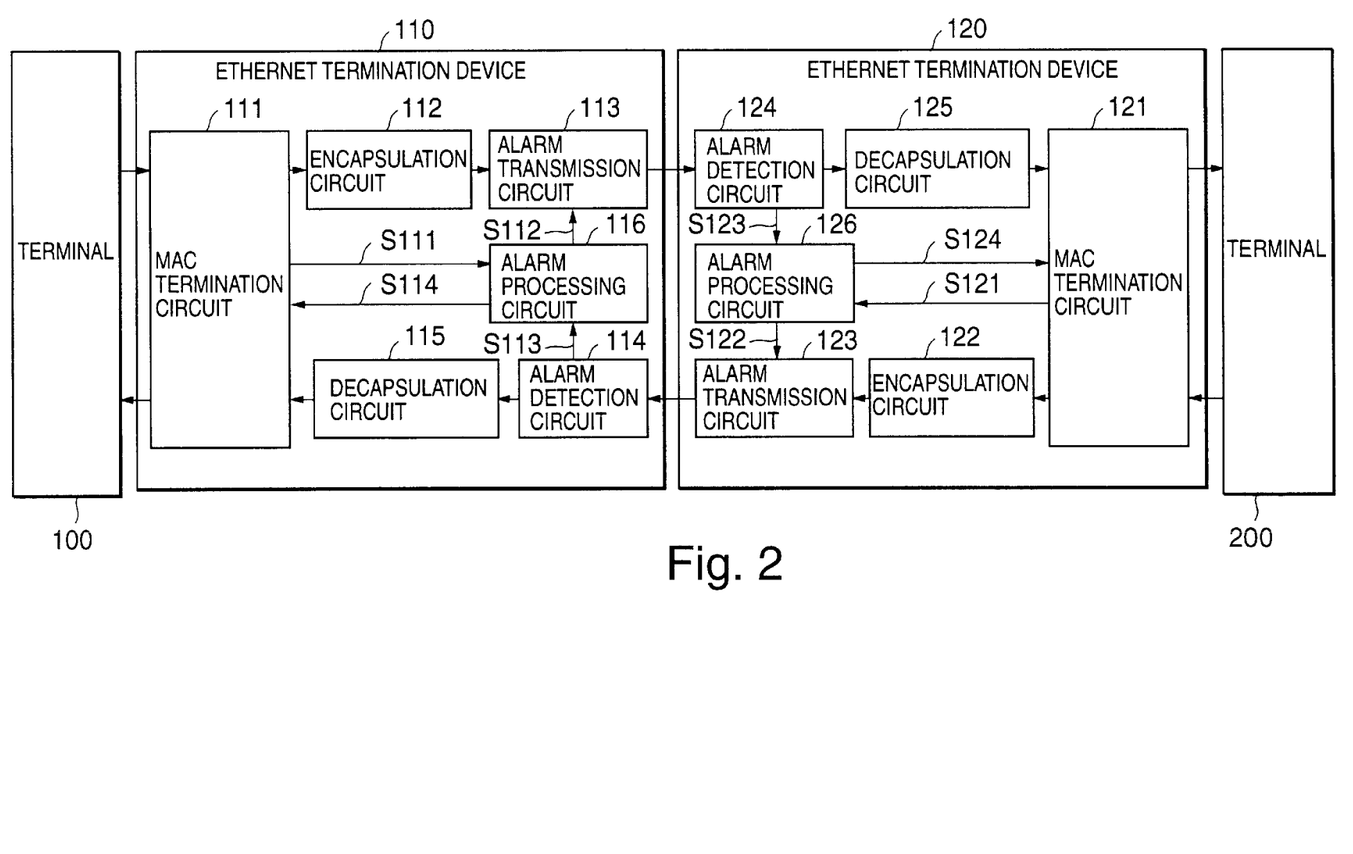
FIG. 2 is a block diagram showing a configuration of a transmission system adopting an alarm transfer system according to a first embodiment of this invention.

Now, description will be made regarding a first embodiment which preferably embodies a mode of alarm transfer according to this invention. FIG. 2 shows a configuration of a transmission system adopting the mode of alarm transfer of this embodiment. This transmission system includes terminals 100 and 200, and Ethernet termination devices 110 and 120. The Ethernet termination device 110 and the Ethernet termination device 120 are disposed opposite to each other.

The Ethernet termination device 110 includes an MAC termination circuit 111, an encapsulation circuit 112, an alarm transmission circuit 113, an alarm detection circuit 114, a decapsulation circuit 115 and an alarm processing circuit 116.

The MAC termination circuit 111 terminates a media access control (MAC) frame. The MAC termination circuit 111 also detects a link condition and notifies the alarm processing circuit 116 of the link condition. Further, the MAC termination circuit 111 disconnects a link forcibly based on an instruction from the alarm processing circuit 116. The encapsulation circuit 112 encapsulates a packet received at the MAC termination circuit 111 by use of the GFP or the like. The alarm transmission circuit 113 transmits a link down alarm toward the opponent Ethernet termination device 120 via a main signal (a transmission path for packet data) based on an instruction from the alarm processing circuit 116. The alarm detection circuit 114 detects the link down alarm out of a signal received from the opponent Ethernet termination device 120 and notifies the alarm processing circuit 116 of the link down alarm. The decapsulation circuit 115 extracts and obtains the packet data out of the encapsulated data. The alarm processing circuit 116 judges as to whether the link down alarm should be transferred or not, also as to whether forcible link down control should take place or not, based on link information notified from the MAC termination circuit 111 and the link down alarm notified from the alarm detection circuit 114. Further, the alarm processing circuit 116 also instructs the alarm transmission circuit 113 to transmit the link down alarm and also instructs the MAC termination circuit 111 to perform the forcible link down control.

Note that the Ethernet termination device 120 also has a configuration similar to the Ethernet termination device 110. Specifically, the Ethernet termination device 120 includes an MAC termination circuit 121, an encapsulation circuit 122, an alarm transmission circuit 123, an alarm detection circuit 124, a decapsulation circuit 125 and an alarm processing circuit 126.

Functions of the respective components of the Ethernet termination device 120 are equivalent to the relevant components of the Ethernet termination device 110.

Now, description will be made on an assumption that the terminal 100 is a sender and the terminal 200 is a receiver. On the Ethernet termination device 110, an Ethernet signal inputted from the terminal 100 is terminated by the MAC termination circuit 111 and a packet is thereby extracted. The extracted packet is encapsulated by the encapsulation circuit 112 and then transmitted to the opponent Ethernet termination device 120.

The Ethernet termination device 120 restores the encapsulated packet data received from the Ethernet termination device 110 to the original packet by use of the decapsulation circuit 125. Then, the MAC termination circuit 121 reconstructs an Ethernet frame and the Ethernet frame is outputted to the terminal 200.

The alarm transmission circuit 113 and the alarm detection circuit 124 do not perform any processing so far as a failure is not present.

Figure 3:
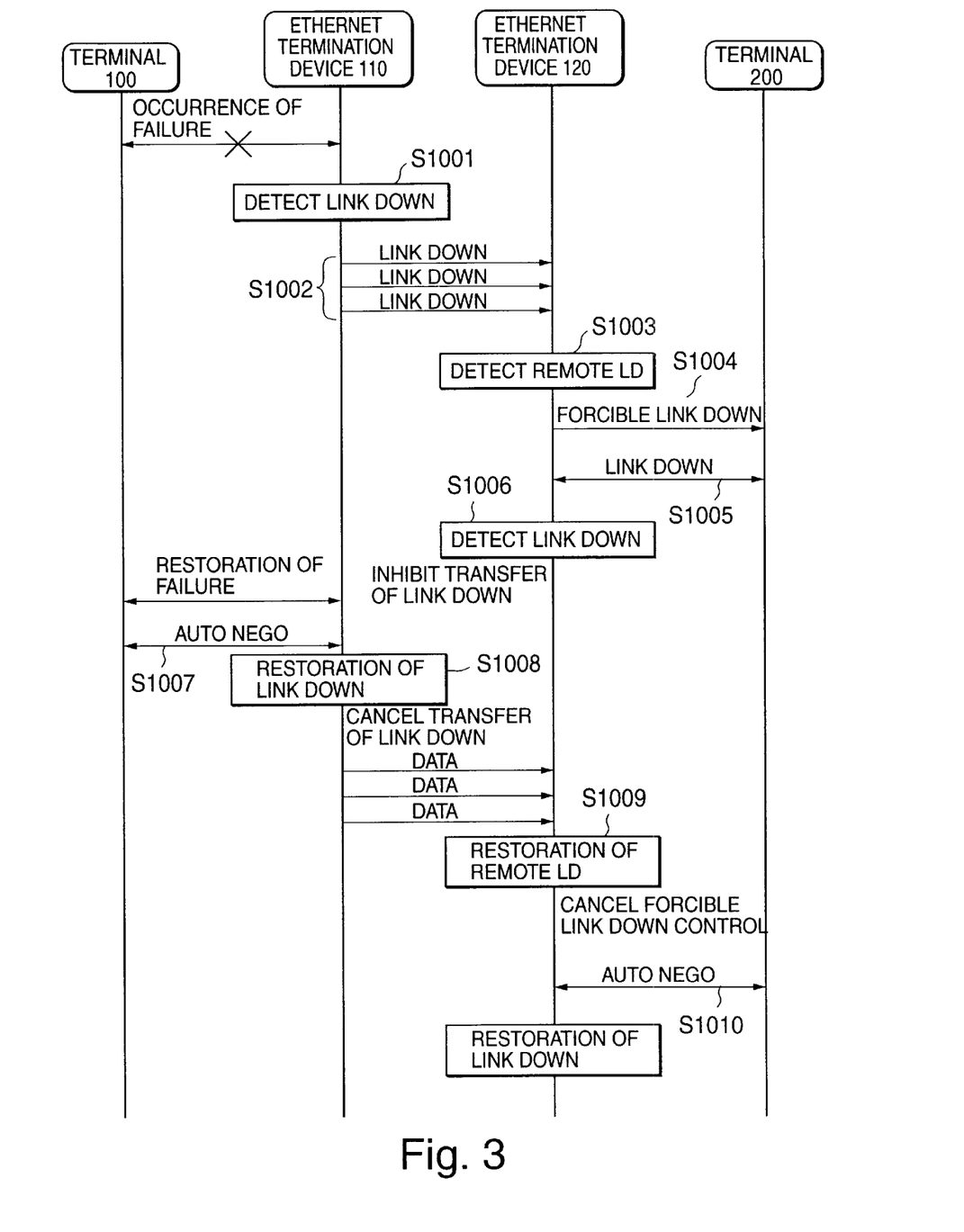
FIG. 3 is a sequence diagram showing a flow of an operation when a failure occurs between a terminal and an Ethernet termination device in the alarm transfer system according to the first embodiment.

FIG. 3 shows a control sequence when a failure occurs between the terminal 100 and the Ethernet termination device 110. An operation in this case will be described by use of FIG. 2 and FIG. 3.

When a failure occurs between the Ethernet termination device 110 and the terminal 100 and the MAC termination circuit 111 detects a link down (Step S1001 in FIG. 3), link down information (Step Sill in FIG. 2) is sent to the alarm processing circuit 116. Upon receipt of the link down information (Step S111 in FIG. 2), the alarm processing circuit 116 notifies the alarm transmission circuit 113 of a link down alarm transmission instruction (Step S112 in FIG. 2). Upon receipt of the link down alarm transmission instruction (Step S112 in FIG. 2), the alarm transmission circuit 113 transfers the link down information to the opponent Ethernet termination device 120 (Step S1002 in FIG. 3).

In the case of the GFP, the method of transferring the link down information conceivably includes a method of defining and transferring an alarm bit inside a payload header, a method of defining and transferring an OAM (which stands for "operations, administration and maintenance") frame, and the like. It is also possible to transfer the link down information in a similar manner according to other encapsulation modes. Note that the GFP refers to an encapsulation mode now being standardized by a standard-setting organization called the T1X1.5.

On the Ethernet termination device 120, the alarm detection circuit 123 detects the link down alarm out of the data signal (Step S1003 in FIG. 3) and notifies the alarm processing circuit 126 of the link down alarm (Step S123 in FIG. 2). Upon notification of the link down alarm, the alarm processing circuit 126 instructs the MAC termination circuit 121 to disconnect the data link with the terminal forcibly (Step S124 in FIG. 2). Upon receipt of the forcible link down instruction (Step S124 in FIG. 2), the MAC termination circuit 121 controls so as to disconnect the data link (Step S1004 in FIG. 3).

The method of forcibly disconnecting the data link includes a method of setting an output signal to an open state and thereby outputting no signals in the case where connection to the terminal relies on electric signals. If connection to the terminal relies on optical signals, then there is also a method of stopping optical outputs. In the case of controlling so as to stop the optical outputs, the alarm processing circuit 126 may control an optical module. Note that the optical module is not illustrated in FIG. 2.

The data link between the Ethernet termination device 120 and the terminal 200 is disconnected by performing the forcible link down control (Step S1005 in FIG. 3). The MAC termination circuits 121 detects the link down (Step S1006 in FIG. 3) and notifies the alarm processing circuit 126 of link down information (Step S121 in FIG. 2).

The alarm processing circuit 126 has already detected the link down information from the opponent device (the Ethernet termination device 110) prior to detecting the link down information at the original device (the Ethernet termination device 120). Accordingly, the alarm processing device 126 withholds notification of a link down alarm transmission instruction (Step S122 in FIG. 2) to the alarm transmission circuit 123 (Step S122 in FIG. 2).

Thereafter, when the failure is restored to normal, auto-negotiation control is executed between the MAC termination circuit 111 and the terminal 100, whereby connection is established therebetween (Step S1007 in FIG. 3). When the link is established, the MAC termination circuit 111 will not detect the link down thereafter (Step S1008 in FIG. 3).

Meanwhile on the Ethernet termination device 120, when the MAC termination circuit 121 detects restoration of the link down at the opponent device (the Ethernet termination device 110) (Step S1009 in FIG. 3), the alarm processing circuit 126 cancels the instruction of the forcible link down control to the MAC termination circuit 121 (Step S1009 in FIG. 3). When the forcible link down control is cancelled at the MAC termination circuit 121, auto-negotiation control is executed between the MAC termination circuit 121 and the terminal 200 to establish a link (Step S1010 in FIG. 3), whereby connection is established therebetween. When the link is established, the MAC termination circuit 121 will not detect the link down thereafter. Eventually, the Ethernet path between the terminals becomes usable.

Figure 4:
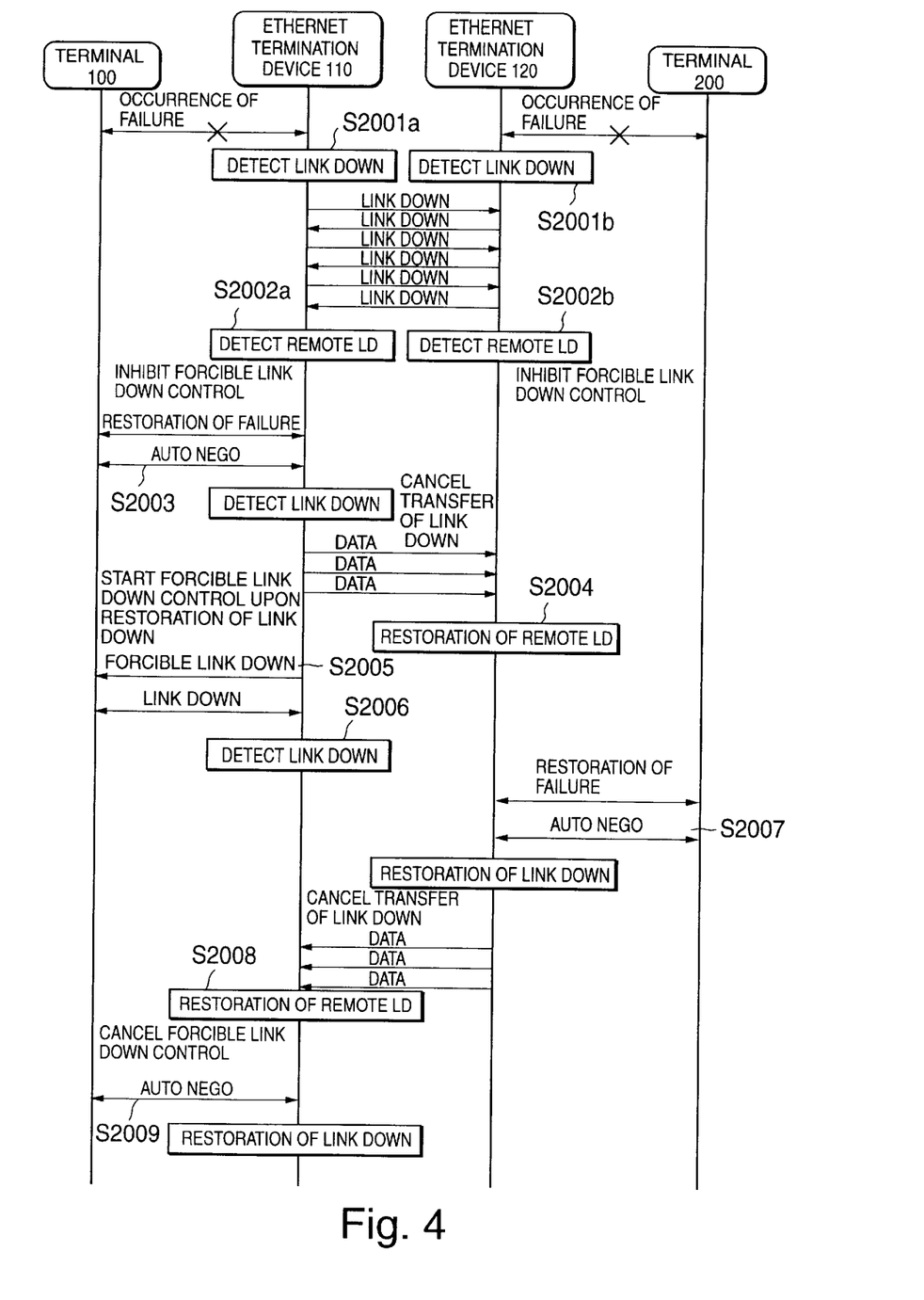
FIG. 4 is a sequence diagram showing a flow of an operation when data links between the terminals and the Ethernet termination devices are disconnected simultaneously in two locations in the alarm transfer system according to the first embodiment.

FIG. 4 shows a control sequence when the data link between the terminal 100 and the Ethernet termination device 110 and the data link between the terminal 200 and the Ethernet termination device 120 are disconnected simultaneously. An operation in this case will be described by use of FIG. 2 and FIG. 4.

By influences of time for processing alarm transmission and delay attributable to the transmission path, the Ethernet termination device 110 first detects the link down at the original device (the Ethernet termination device 110) (Step S2001*a* in FIG. 4) and then detects a link down alarm from the opponent device (the Ethernet termination device 120) (Step S2002*a* in FIG. 4).

Similarly, the Ethernet termination device 120 first detects-the link down at the original device (the Ethernet termination device 120) (Step S2001*b* in FIG. 4) and then detects a link down alarm from the opponent device (the Ethernet termination device 110) (Step S2002*b* in FIG. 4).

In this case, on the Ethernet termination device 110, the alarm detection circuit 114 detects link down information from the opponent device (the Ethernet termination device 120) and notifies the alarm processing circuit 116 of the link down information in a state when the MAC termination circuit 111 detects the link down of the original device (the Ethernet termination device 110) and is notifying the alarm processing circuit 116 of the link down.

The alarm processing circuit 116 has detected the link down of the original device (the Ethernet termination device 110) prior to detecting the link down of the opponent device (the Ethernet termination device 120). Accordingly, the alarm processing circuit 116 does not perform the forcible link down control based on the link down alarm received from the opponent device (the Ethernet termination device 120). Similar control is performed on the Ethernet termination device 120 as well.

If the forcible link down is performed in this event, then both the link between the Ethernet termination device 110 and the terminal 100, and the link between the Ethernet termination device 120 and the terminal 200 are set to the states of forcible link down. In that case, the both Ethernet termination devices will await restoration of the failure occurred at the opponent device. As a consequence, it is impossible to reestablish the link between the termination devices.

Therefore, it is preferred not to perform the forcible link down control based on the link down alarm received from the opponent device in this case.

Thereafter, assuming that the failure between the terminal 100 and the Ethernet termination device 110 is restored before restoration of the other failure, then auto-negotiation control is executed between the MAC termination circuit 111 and the terminal 100 (Step S2003 in FIG. 4), whereby connection is established. Accordingly, restoration at the opponent device (the Ethernet termination device 110) is detected by the Ethernet termination device 120 (Step S2004 in FIG. 4).

On the Ethernet termination device 110, when the MAC termination circuit 111 does not detect the link down any longer owing to the establishment of the connection to the terminal 100, the alarm processing circuit 116 instructs the MAC termination circuit 111 to perform the forcible link down control (Step S114 in FIG. 2). Upon receipt of the instruction, the MAC termination circuit 111 performs the forcible link down control (Step S2005 in FIG. 4), whereby the link with the terminal 100 is disconnected. In this way, the link down is detected by the MAC termination circuit 111 (Step S2006 in FIG. 4).

Subsequently, when the failure between the Ethernet termination device 120 and the terminal 200 is restored, auto-negotiation control is executed between the MAC termination device 120 and the terminal 200 (Step S2007 in FIG. 4), whereby connection is established. Accordingly, restoration at the opponent device (the Ethernet termination device 120) is detected by the Ethernet termination device 110 (Step S2008 in FIG. 4). Upon detection, the alarm processing circuit 116 cancels the instruction of the forcible link down control to the MAC termination circuit 111. Thereafter, auto-negotiation control is executed between the MAC termination device 111 and the terminal 100 (Step S2009 in FIG. 4), whereby connection is established. When the link is established, the MAC termination circuit 111 will not detect the link down thereafter. Eventually, the Ethernet path between the terminals becomes usable.

Second Embodiment

Next, description will be made regarding a second embodiment which preferably embodies the mode of alarm transfer according to this invention.

Figure 5:
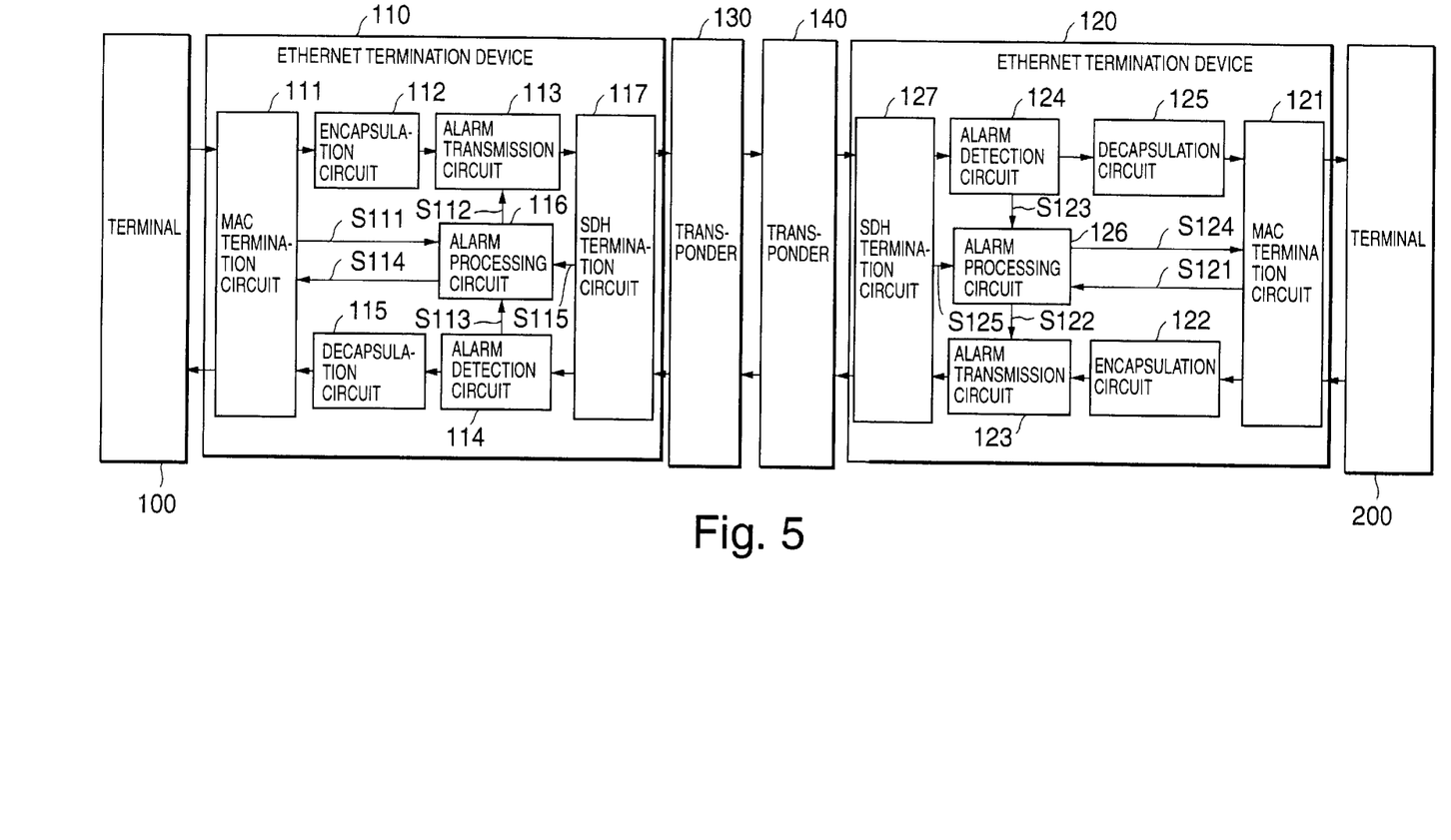
FIG. 5 is a block diagram showing a configuration of a transmission system adopting an alarm transfer system according to a second embodiment of this invention.

FIG. 5 shows a configuration of a transmission system adopting the mode of alarm transfer of this embodiment. This transmission system includes terminals 100 and 200, Ethernet termination devices 110 and 120, and transponders 130 and 140.

Accordingly, the mode of alarm transfer of this embodiment has the configuration which includes the transponders 130 and 140 interposed between the Ethernet termination devices 110 and 120, in addition to the mode of alarm transfer according to the first embodiment.

The Ethernet termination device 110 of this embodiment includes an SDH termination circuit 117 in addition to the configuration described in the first embodiment.

An alarm processing circuit 116 of this embodiment judges as to whether a link down alarm should be transferred or not, also as to whether forcible link down control should take place or not, based on link information notified from an MAC termination circuit 111, the link down alarm notified from an alarm detection circuit 114, and an SDH alarm notified by the SDH termination circuit 117. Further, the alarm processing circuit 116 also instructs an alarm transmission circuit 113 to transmit the link down alarm and also instructs the MAC termination circuit 111 to perform the forcible link down control.

The SDH (which stands for "synchronous digital hierarchy") termination circuit 117 is an interface between the Ethernet termination device 110 and an intermediate path (the transponders 130 and 140). The SDH termination circuit 117 detects a failure occurred on the intermediate path. The Ethernet termination device 120 further includes an SDH termination circuit 127 in addition to the configuration described in the first embodiment. Functions of the respective components of the Ethernet termination device 120 are equivalent to the relevant components of the Ethernet termination device 110.

Figure 6:
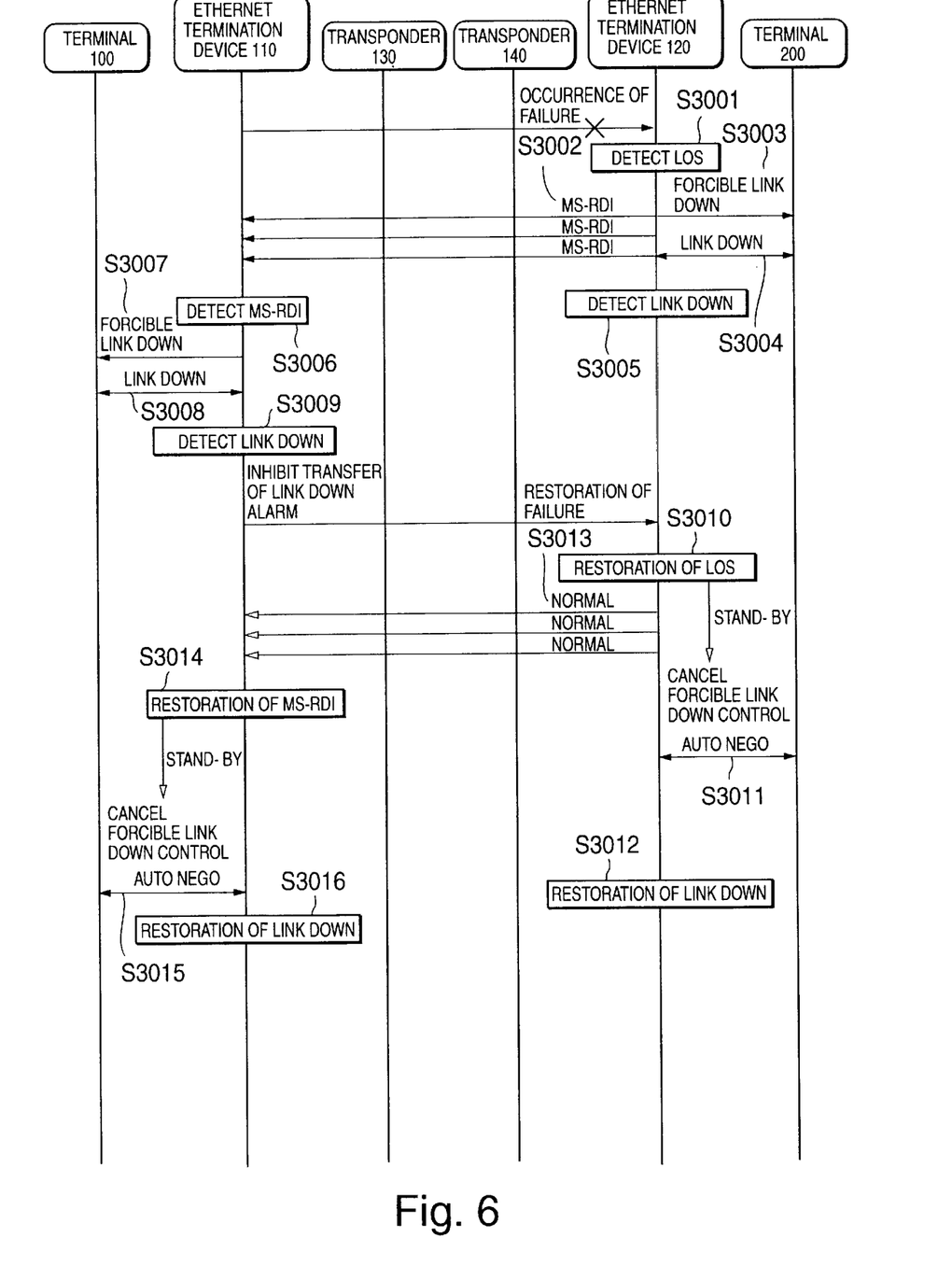
FIG. 6 is a sequence diagram showing a flow of an operation when a failure occurs on a transmission path between Ethernet termination devices in the alarm transfer system according to the second embodiment.

FIG. 6 shows an operation sequence of the mode of alarm transfer according to this embodiment. An operation in this case will be described by use of FIG. 5 and FIG. 6.

When a failure occurs on the transmission path on the way from the transponder 140 to the Ethernet termination device 120, loss of signal (LOS) is detected by the SDH termination circuit 127 in the Ethernet termination device 120 (Step S3001 in FIG. 6), and an SDH alarm (Step S125 in FIG. 5) is notified to the alarm processing circuit 126. Simultaneously, the SDH termination circuit 127 transmits a multiplex section—remote defect indication (MS-RDI) to the opponent device (the Ethernet termination device 110) (Step S3002 in FIG. 6).

The alarm processing circuit 126 instructs the MAC termination circuit 121 to perform the forcible link down control (Step S124 in FIG. 5). Accordingly, the MAC termination circuit 121 performs the forcible link down (Step S3003 in FIG. 6) and thereby disconnects the link with the terminal 200 (Step S3004 in FIG. 6).

Although the MAC termination circuit 121 detects the link down attributable to the forcible link down control (Step S3005 in FIG. 6), the link down alarm is not transmitted to the opponent device (the Ethernet termination device 110) because the SDH alarm (here, the LOS) has been detected already.

The MS-RDI transmitted from the Ethernet termination device 120 is notified to the Ethernet termination device 110 via the transponder 140 and the transponder 130. The SDH termination circuit 117 in the Ethernet termination device 110 detects the MS-RDI received from the Ethernet termination device 120 (Step S3006 in FIG. 6) and notifies the alarm processing circuit 116 of the SDH alarm (Step S115 in FIG. 5).

The alarm processing circuit 116 instructs the MAC termination circuit 111 to perform the forcible link down (Step S114 in FIG. 5). The MAC termination circuit 111 performs the forcible link down control (Step S3007 in FIG. 6) and thereby disconnects the link with the terminal 100 (Step S3008 in FIG. 6).

Although the MAC termination circuit 111 detects the link down attributable to the forcible link down control (Step S3009 in FIG. 6), the link down alarm is not transmitted to the opponent device (the Ethernet termination device 120) because the SDH alarm (here, the MS-RDI) has been detected already.

When the failure on the transmission path is restored, the SDH termination circuit 127 of the Ethernet termination device 120 does not detect the LOS any longer. Accordingly, notification of the SDH alarm (Step S125 in FIG. 5) to the alarm processing circuit 126 is cancelled. The alarm processing circuit 126 continues the forcible link down control after the LOS notification disappeared, and then cancels the forcible link down control after passage of a given time interval (Step S3010 in FIG. 6). When the forcible link down control is canceled, auto-negotiation control for establishing a link is executed between the MAC termination circuit 121 and the terminal 200 (Step S3011 in FIG. 6), whereby the link is established. When the link is established, the MAC termination circuit 121 will not detect the link down any longer (Step S3012 in FIG. 6).

Meanwhile, when the LOS is not detected any longer, the MAC termination circuit 121 cancels transmission of the MS-RDI (Step S3013 in FIG. 6). When the SDH termination circuit 117 of the Ethernet termination device 110 stops detecting the MS-RDI, the SDH termination circuit 117 notifies the alarm processing circuit 116 of the cancellation of detecting the MS-RDI, whereby the alarm processing circuit 116 cancels the instruction of the forcible link down control to the MAC termination circuit 111 (Step S3014 in FIG. 6).

When the MAC termination circuit 111 cancels the forcible link down control, auto-negotiation control for establishing a link is executed between the MAC termination circuit 111 and the terminal 100 (Step S3015 in FIG. 6), whereby the link is established. When the link is established, the MAC termination circuit 111 will not detect the link down any longer (Step S3016 in FIG. 6).

Here, it is necessary to delay cancellation of the forcible link down control for a given time period upon restoration of the SDH alarm. The reason will be described by use of FIG. 7.

Figure 7:
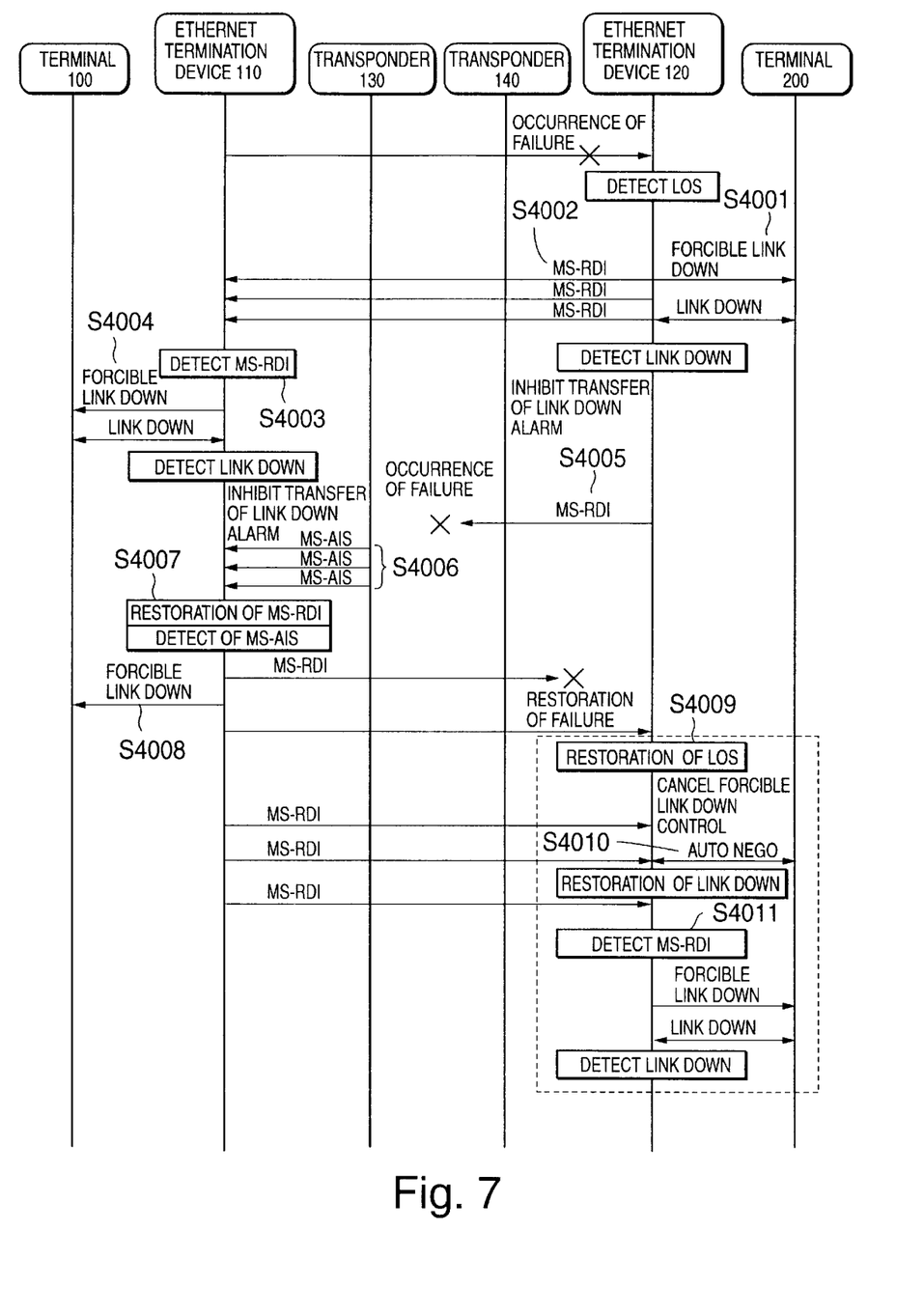
FIG. 7 is a sequence diagram showing a flow of an operation to delay canceling forcible link down control for a given time interval when an SDH alarm is restored.

When the failure occurs on the transmission path on the way from the transponder 140 to the Ethernet termination device 120, the Ethernet termination device 120 performs the forcible link down control of the original device (the Ethernet termination device 120) (Step S4001 in FIG. 7) and transmits the MS-RDI to the opponent Ethernet termination device 110 (Step S4002 in FIG. 7).

Upon detection of the MS-RDI (Step S4003 in FIG. 7), the Ethernet termination device 110 performs the forcible link down control (Step S4004 in FIG. 7) and thereby disconnects the link with the terminal 100.

In this state, if another failure occurs on a transmission path on the way from the Ethernet termination device 120 to the Ethernet termination device 110 (when the failure occurs on a transmission path on the way from the transponder 140 to the transponder 130 in this case), the MS-RDI transmitted from the Ethernet termination device 120 does not reach the Ethernet termination device 110 (Step S4005 in FIG. 7).

In this case, the transponder 130 detects occurrence of the failure and transmits a multiplex section—alarm indication signal (MS-AIS) to the Ethernet termination device 110 (Step S4006 in FIG. 7). The SDH termination circuit 117 of the Ethernet termination device 110 detects the MS-RDI again, and also detects the MS-AIS (Step S4007 in FIG. 7). Therefore, although the MS-RDI is restored, notification of the SDH alarm to the alarm processing circuit 116 is maintained because the MS-AIS is detected simultaneously. Accordingly, the forcible link down control is also maintained (Step S4008 in FIG. 7). Meanwhile, the SDH termination circuit 117 transfers the MS-RDI to the opponent device (the Ethernet termination device 120) due to detection of the MS-AIS. However, because of the precedent failure, the MS-RDI will not reach the Ethernet termination device 120.

If the precedent failure is restored in this state (Step S4009 in FIG. 7), then the MS-RDI transferred from the Ethernet termination device 110 will be received by the Ethernet termination device 120. The Ethernet termination device 120 establishes an SDH frame upon receipt of the MS-RDI continuously for two frames (where one frame is equal to 125 µs) after restoration of the LOS (Step S4010 in FIG. 7). In other words, at least a two-frame time period is required in order to establish SDH frame synchronization. Subsequently, the Ethernet termination device 120 confirms detection of the MS-RDI for the first time by receiving the MS-RDI continuously for three more frames (Step S4011 in FIG. 7).

Therefore, a time period for 625 µis at least required from restoration of the LOS to detection of the MS-RDI. Moreover, when the LOS is restored, the forcible link down control with respect to the terminal 200 is canceled, whereby a link establishing operation is executed.

Here, assuming that the link is established during the period from restoration of the LOS and detection of the MS-RDI, the link deems to be restored to a normal state temporarily.

However, in reality, the other problem (the problem occurring on the transmission path on the way from the transponder 130 to the transponder 140) is still present. Accordingly, the Ethernet path between the terminals still remains unusable.

In order to solve the above-described problem of normalization of the link despite the unusable condition of the Ethernet path between the terminals, it is preferred to delay cancellation of the forcible link down control for a period sufficient for detecting either the MS-RDI or the MS-AIS after restoration of the LOS.

As described above, according to the mode of alarm transfer of the above-described embodiment adopting this invention, it is possible to control not to transfer the link down alarm upon detection of the link down as a result of execution of the forcible link down control attributable to either transfer of the link down alarm from the opponent device or receipt of the SDH alarm.

Moreover, when the SDH alarm is restored during execution of the forcible link down control attributable to detection of the SDH alarm, the forcible link down control will not be cancelled immediately after the restoration of the failure. Instead, it is possible to delay cancellation of the forcible link down control for the time period sufficient for detecting AIS/RDI after establishing the SDH frame synchronization. Here, cancellation of the forcible link down control can be delayed or not delayed in the event of restoration of the AIS/RDI. However, cancellation of the forcible link down should be delayed at least in the event of restoration of LOS/LOF.

Furthermore, if the Ethernet termination device is a multiplexer device for multiplexing a plurality of giga-bit Ethernet (GbE) signals, then it is possible to transfer an alarm depending on each Ethernet signal. On the contrary, an opponent Ethernet multiplexer device can identify the Ethernet signal from the sender. Accordingly, it is possible to perform the forcible link down control only with respect to a targeted terminal.

It is to be noted that the foregoing embodiments are just examples of the preferred embodiments of the mode of alarm transfer according to this invention. In other words, this invention is not limited to the embodiments described above.

Figure 8:
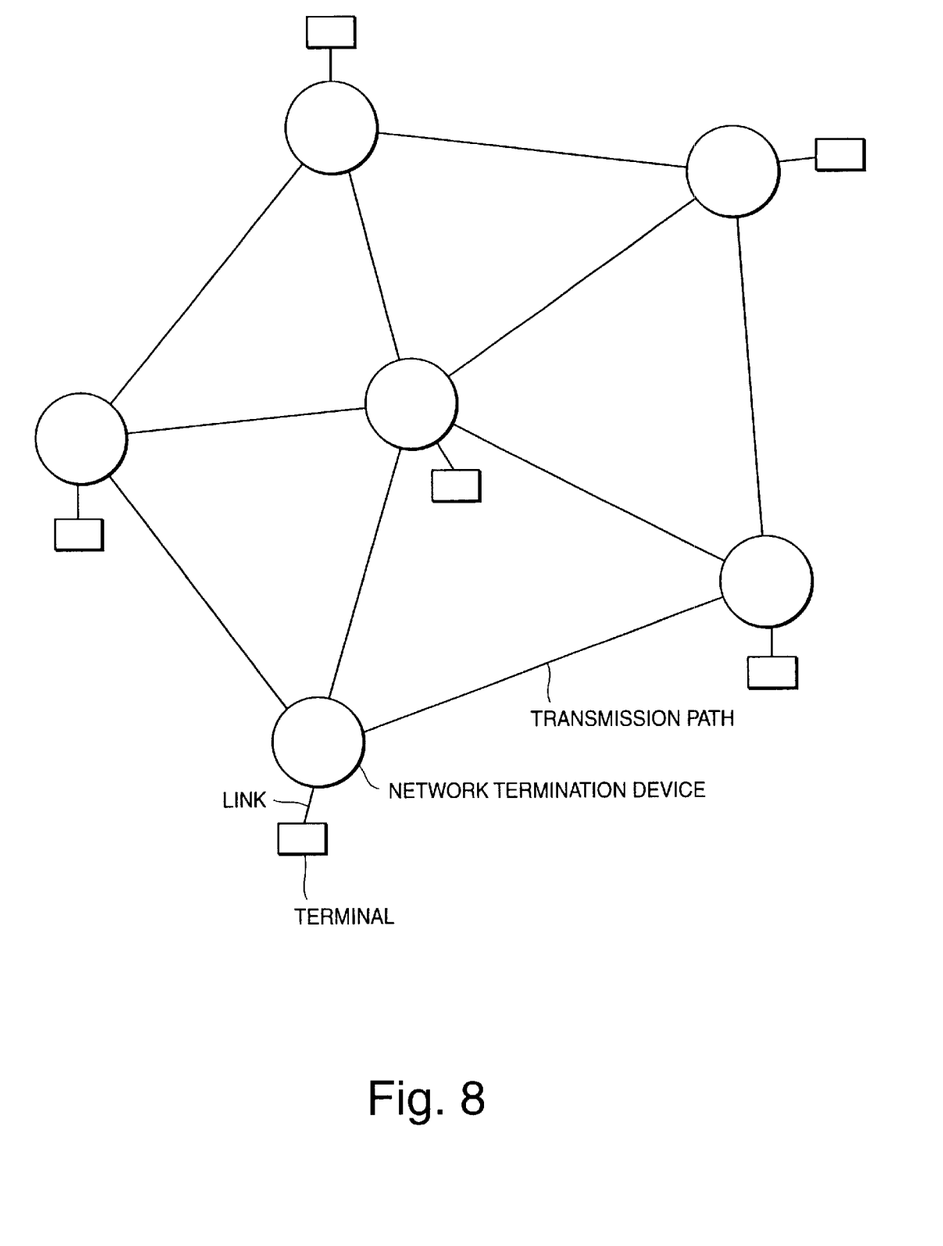
FIG. 8 is a block diagram showing another configuration of an alarm transfer system according to this invention.

For example, in the foregoing embodiments, description has been made regarding the mode of alarm transfer of this invention based on the example of the transmission system consisting of two terminals and two Ethernet termination devices. Nevertheless, it is also possible to apply the mode of alarm transfer of this invention to a transmission system including more than two terminals and more than two Ethernet termination devices as shown in FIG. 8.

Moreover, in the foregoing embodiments, description has been made based on the assumption that the terminal 100 is the sender and the terminal 200 is the receiver. However, similar control is also feasible if the above-mentioned functions are reversed.

Moreover, the transmission system according to the first embodiment may further include a transponder, or the transmission system according to the second embodiment does not always have to further include a transponder. Even in those cases, it is possible to carry out the control similar to those described in the respective embodiments.

In this way, various modifications and alterations are possible without departing from the spirit and scope of this invention.

As it is made clear from the foregoing description, according to the mode of alarm transfer adopting this invention, it is possible to provide a mode of alarm transfer suitable for a system which performs link control between a terminal and an Ethernet termination device.

Moreover, when an Ethernet path is not usable in a transitional state of restoration of a failure because of another failure, it is possible to avoid a temporary state of link establishment.

In addition, since two terminals on both ends can monitor a link down and thereby recognize a failure on an Ethernet path, it is possible to utilize the link down as a moment of protection switching. In other words, when a failure is detected on a transmission path, it is possible to rescue lines by means of switching to a backup transmission path.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A network termination device for transmitting a data signal from a terminal connected through a link toward another network termination device via a transmission path, the network termination device comprising:
   an alarm processing circuit for detecting notification of a link down of the link connected to the other network termination device and occurrence of a failure on the transmission path,
   wherein the network termination device disconnects the link forcibly and withholds notification of the disconnection outward when the alarm processing circuit detects any of the notification and the occurrence of the failure.

2. The network termination device according to claim 1, wherein the network termination device cancels forcible link down control after passage of a given time period from restoration of a failure when the forcible link down control is performed based on the failure on the transmission path.

3. The network termination device according to claim 1, further comprising:
   a cross-connect device for changing connections among a plurality of giga-bit Ethernet input signals and a plurality of giga-bit Ethernet output signals.

4. The network termination device according to claim 1, further comprising:
   a multiplexer device for multiplexing a plurality of giga-bit Ethernet signals.

5. An alarm transfer system comprising:
  a plurality of network termination devices severally connected to corresponding terminals, the network termination devices being connected to one another via a transmission path,
  wherein at least one of the network termination devices includes the network termination device according to claim 1.

6. The alarm transfer system according to claim 5, further comprising:
  at least one transponder interposed between two mutually opponent network termination devices of the plurality of the network termination devices.

7. The alarm transfer system according to claim 5,
  wherein the termination devices perform notification of a link down of the link depending on each Ethernet signal, and
  the termination device receiving the notification identifies the Ethernet signal of the termination device sending the notification and thereby performs forcible link down control with respect to the terminal corresponding thereto.

8. An alarm transferring method for use in a system for transmitting a data signal between a first network termination device connected to a first terminal through a first link and a second network termination device connected to a second terminal through a second link via a transmission path, the method comprising the steps of:
  detecting notification from the second network termination device concerning a link down of the second link and occurrence of a failure on the transmission path by use of the first network termination device; and
  disconnecting the first link forcibly based on the detection,
  wherein the first network termination device withholds notification to the second network termination device regarding the disconnection of the first link when the step of disconnecting is executed.

9. The alarm transferring method according to claim 8, further comprising the step of:
  canceling link down control after passage of a given time period from restoration of the failure when the link down control is performed forcibly based on the failure occurring on the transmission path.

10. The alarm transferring method according to claim 8, further comprising the steps of:
  performing the notification depending on each Ethernet signal by use of any one out of the first and the second network termination devices; and
  performing forcible link down control only with respect to a targeted network termination device after identifying the Ethernet signal from the network termination device sending the notification by use of the other network termination device.

11. An alarm transferring method for use in a system for transmitting a data signal among at least three network termination devices via a transmission path, the network termination devices being severally connected to corresponding terminals through links, the method comprising the steps of:
  detecting notification concerning a link down of the link from any other network termination device and occurrence of a failure on the transmission path connected to the network termination device performing detection by use of any one of the network termination devices; and
  performing forcible link down control based on the detection,
  wherein the network terminal device withholds notification to the rest of the network termination devices regarding execution of the link down control.

12. The alarm transferring method according to claim 11, wherein the network termination device cancels the forcible link down control after passage of a given time period from restoration of a failure when the forcible link down control is performed based on the failure on the transmission path.

* * * * *